United States Patent
James et al.

(10) Patent No.: US 7,311,639 B2
(45) Date of Patent: Dec. 25, 2007

(54) METHOD FOR IMPROVING A DRIVE-TO-PARK SHIFT

(75) Inventors: Steven F. James, Zionsville, IN (US); Phillip F. Mc Cauley, Zionsville, IN (US); Jeffrey K. Runde, Fishers, IN (US); Scott T. Kluemper, Monrovia, IN (US); Andrew L. Mitchell, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 239 days.

(21) Appl. No.: 11/137,829

(22) Filed: May 25, 2005

(65) Prior Publication Data

US 2006/0270521 A1    Nov. 30, 2006

(51) Int. Cl.
*B60W 10/04*    (2006.01)
(52) U.S. Cl. ..................... 477/188; 192/219.5
(58) Field of Classification Search .............. 477/182, 477/183, 187, 188; 192/219.5, 219.4, 215; 475/116, 131
See application file for complete search history.

(56) References Cited

U.S. PATENT DOCUMENTS

| | | | |
|---|---|---|---|
| 5,211,079 A | 5/1993 | Runde et al. ................ 74/866 |
| 6,619,460 B1 * | 9/2003 | Carlsson et al. ......... 192/219.5 |
| 6,631,796 B2 * | 10/2003 | Yanaka et al. ........... 192/219.4 |
| 6,802,571 B2 * | 10/2004 | Ishimaru et al. ............... 303/3 |
| 6,878,096 B1 * | 4/2005 | Winner et al. ................ 477/94 |
| 7,204,785 B2 * | 4/2007 | Berger et al. ................ 477/94 |
| 2004/0226768 A1 * | 11/2004 | DeLuca et al. ............. 180/275 |
| 2005/0257632 A1 * | 11/2005 | Runde et al. .............. 73/865.9 |

* cited by examiner

*Primary Examiner*—David D. Le
*Assistant Examiner*—Justin K. Holmes

(57) ABSTRACT

According to a preferred embodiment of the present invention, a clutch is applied when the vehicle comes to a stop. The application of this clutch locks the output shaft with energy stored therein. When the shift selector is then moved to the park position, the clutch releases the stored energy in a controlled manner by slipping the clutch plates. The controlled slipping reduces the noise as the park pawl tooth contracts an output gear tooth.

19 Claims, 3 Drawing Sheets

METHOD FOR IMPROVING A DRIVE-TO-PARK SHIFT

TECHNICAL FIELD

The present invention is drawn to a method for improving a drive-to-park shift in an automatic transmission.

BACKGROUND OF THE INVENTION

In some instances, when a vehicle is brought to a stop in drive, a "tooth butt" condition can arise. A "tooth butt" condition occurs when one of the teeth on an output gear is aligned with a park pawl tooth. When the shift selector is moved to the park position, potential torsional energy in the stored transmission output shaft is released. This energy release causes the output gear to begin accelerating in a rotational manner until the park pawl can drop into engagement between adjacent output gear teeth. When this happens, the park tooth and one of the output gear teeth collide producing a potentially objectionable noise.

SUMMARY OF THE INVENTION

According to a preferred embodiment of the present invention, the potentially objectionable noise generated by the park tooth contacting one of the output gear teeth is avoided by applying a specific clutch or combination of clutches when the vehicle comes to a stop. The application of this clutch or combination of clutches locks the transmission output shaft with the energy stored therein. When the shift selector is then moved to the park position, the clutch or combination of clutches releases the stored energy in a controlled manner by slipping the clutch plates. The controlled slipping reduces the relative motion between the park pawl and the output gear and therefore reduces the noise generated when the park pawl tooth contacts an output gear tooth.

A method of the present invention provides an improved shift into park in the following manner. A clutch or combination of clutches is applied when the vehicle is stopped such that the transmission output shaft is restrained. When the transmission is shifted into park, a park pawl is engaged with an output gear mounted to the transmission output shaft. As the transmission output shaft is restrained and the output gear is mounted thereto, relative motion between the park pawl and the output gear is minimized and any noised generated by contact between the park pawl tooth and an output gear tooth is reduced. After the park pawl is engaged with the output gear, the clutch or combination of clutches is slowly released in a controlled manner by slipping the clutch plates.

In one aspect of the present invention, the clutch or combination of clutches is applied at a low clutch pressure level such that subsequent vehicle acceleration is not impeded.

In another aspect of the present invention, an algorithm determines whether the operator of the vehicle has completely released the brakes before the clutch or combination of clutches is released.

In yet another aspect of the present invention, an algorithm determines whether the operator of the vehicle has partially released the brakes before the clutch or combination of clutches is released.

In still another aspect of the present invention, an algorithm determines whether the operator of the vehicle has applied a throttle before the clutch or combination of clutches is released.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

The present invention provides a method for improving a drive-to-park shift in an automatic transmission. More precisely, the present invention provides a method for performing the drive to park shift such that a park tooth 92 (shown in FIG. 3a) engages an output gear tooth 96 (shown in FIG. 3a) without making an objectionable noise. The present invention will hereinafter be described in the context of an exemplary powertrain 10 (shown in FIG. 1) used for illustrative purposes. It should, however, be appreciated that the teachings of the present invention may be applied to any number of alternate transmissions as well.

Figures 1, 2:
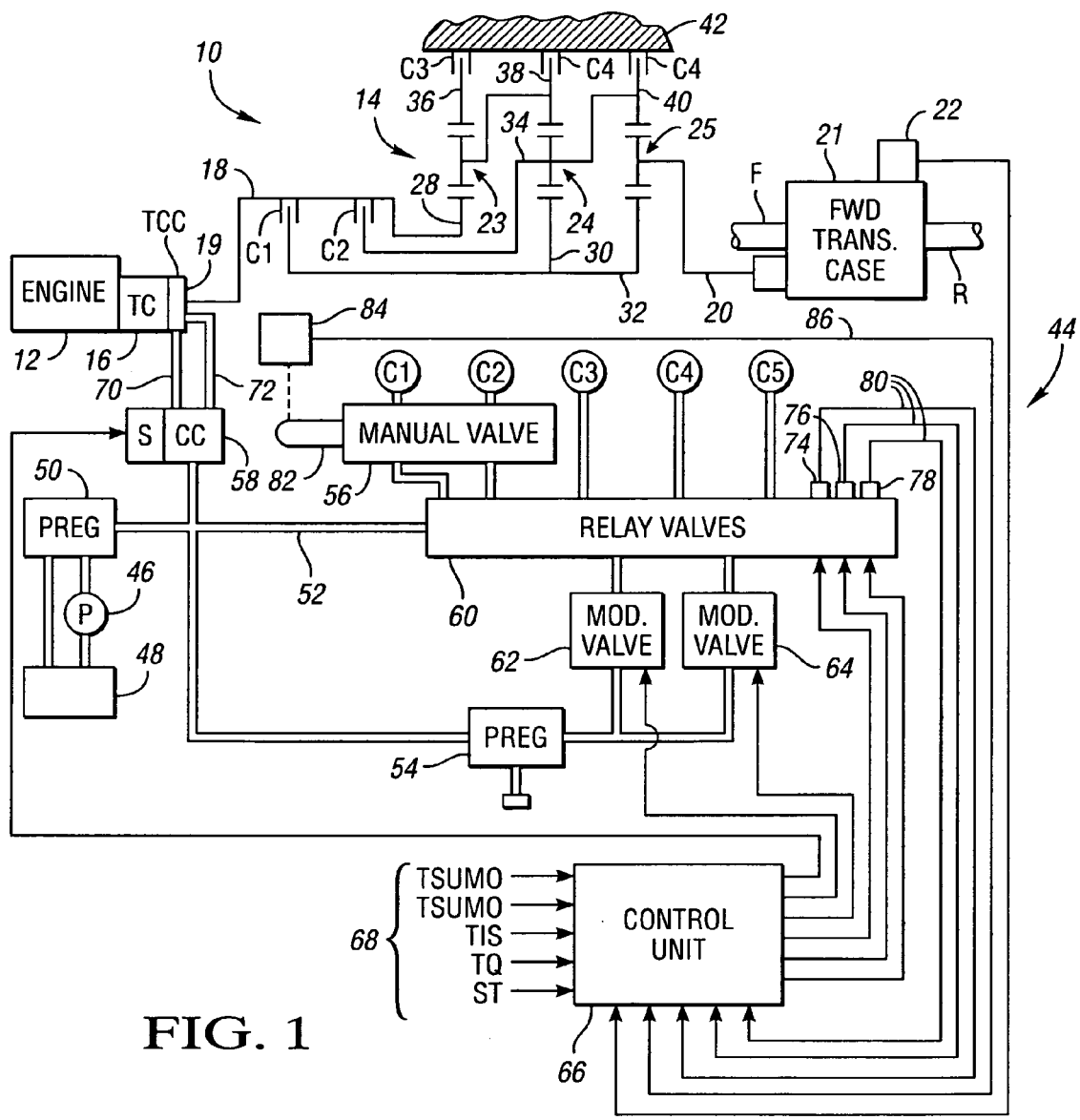
FIG. 1 is a schematic illustration of a powertrain including an automatic transmission.
FIG. 2 is a truth table indicating a relationship between transmission clutch activation and corresponding speed ratio.

Referring to FIG. 1, the vehicle powertrain 10 includes an engine 12, a transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gear sets, designated generally by the reference numerals 23, 24 and 25. The planetary gear set 23 includes a sun gear member 28, a ring gear member 29, and a planet carrier assembly 30. The planet carrier assembly 30 includes a plurality of pinion gears rotatably mounted on a carrier member and disposed in meshing relationship with both the sun gear member 28 and the ring gear member 29. The planetary gear set 24 includes a sun gear member 31, a ring gear member 32, and a planet carrier assembly 33. The planet carrier assembly 33 includes a plurality of pinion gears rotatably mounted on a carrier member and disposed in meshing relationship with both the sun gear member 31 and the ring gear member 32. The planetary gear set 25 includes a sun gear member 34, a ring gear member 35, and a planet carrier assembly 36. The planet carrier assembly 36 includes a plurality of pinion gears rotatably mounted on a carrier member and disposed in meshing relationship with both the sun gear member 34 and the ring gear member 35.

The input shaft 18 continuously drives the sun gear 28 of gear set 23, selectively drives the sun gears 31, 34 of gear sets 24, 25 via clutch C1, and selectively drives the carrier 33 of gear set 24 via clutch C2. The ring gears 29, 32, 35 of gear sets 23, 24, 25 are selectively connected to ground 42 via clutches (i.e., brakes) C3, C4 and C5, respectively.

As diagramed in FIG. 2, the state of the clutches C1-C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1-C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid-operated fluid control valves 58, 60, 62 and 64.

The electronic portion of the electro-hydraulic control system 44 is primarily embodied in the transmission control unit 66, or controller, which is microprocessor-based and conventional in architecture. The transmission control unit 66 controls the solenoid-operated fluid control valves 58-64 based on a number of inputs 68 to achieve a desired transmission speed ratio. Such inputs include, for example, signals representing the transmission input speed TIS, a driver torque command TQ, the transmission output speed TOS, the hydraulic fluid temperature Tsump, and the shift type ST (for example, a 3-2 downshift). Sensors for developing such signals may be conventional in nature, and have been omitted for simplicity.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid-operated fluid control valves 58-64 are generally characterized as being either of the on/off or modulated type. To reduce cost, the electro-hydraulic control system 44 is configured to minimize the number of modulated fluid control valves, as modulated valves are generally more expensive to implement. To this end, fluid control valves 60 are a set of three on/off relay valves, shown in FIG. 1 as a consolidated block, and are utilized in concert with manual valve 56 to enable controlled engagement and disengagement of each of the clutches C1-C5 with only two modulated valves 62, 64. For any selected ratio, the control unit 66 activates a particular combination of relay valves 60 for coupling one of the modulated valves 62, 64 to the on-coming clutch, and the other one of the modulated valves 62, 64 to the off-going clutch. It should, however, be appreciated that the transmission 14 may be implemented with additional modulated valves in alternate embodiments.

The modulated valves 62, 64 each comprise a conventional pressure regulator valve biased by a variable pilot pressure that is developed by current controlled force motors (not shown). Fluid control valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch to shift from one speed ratio to another, develops corresponding force motor current commands, and then supplies current to the respective force motors in accordance with the current commands. Thus, the clutches C1-C5 are responsive to the pressure commands via the valves 58-64 and their respective actuating elements (e.g., solenoids, current-controlled force motors).

As indicated above, each shift from one speed ratio to another includes a fill or preparation phase during which an apply chamber of the on-coming clutch is filled in preparation for torque transmission. Fluid supplied to the apply chamber compresses an internal return spring (not shown), thereby stroking a piston (not shown). Once the apply chamber is filled, the piston applies a force to the clutch plates, developing torque capacity beyond the initial return spring pressure. Thereafter, the clutch transmits torque in relation to the clutch pressure, and the shift can be completed using various control strategies. The usual control strategy involves commanding a maximum on-coming clutch pressure for an empirically determined fill time, and then proceeding with the subsequent phases of the shift. The volume of fluid required to fill an apply chamber and thereby cause the clutch to gain torque capacity is referred to as the "clutch volume."

Figure 3A:
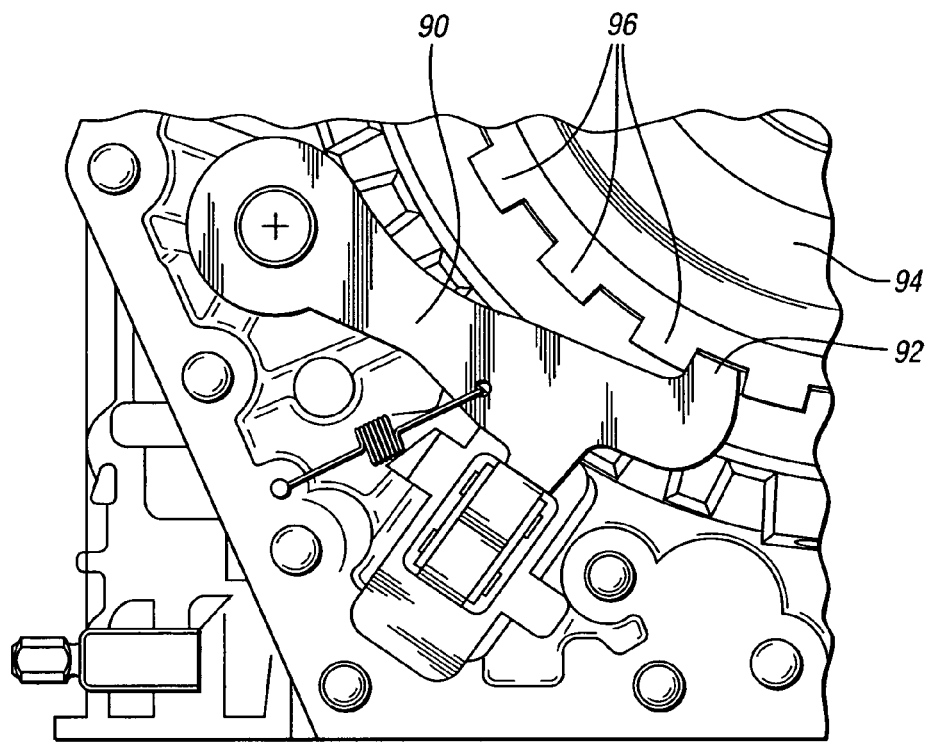
FIG. 3a is a partial side view of a park pawl engaged with an output gear of the present invention.
Figure 3B:
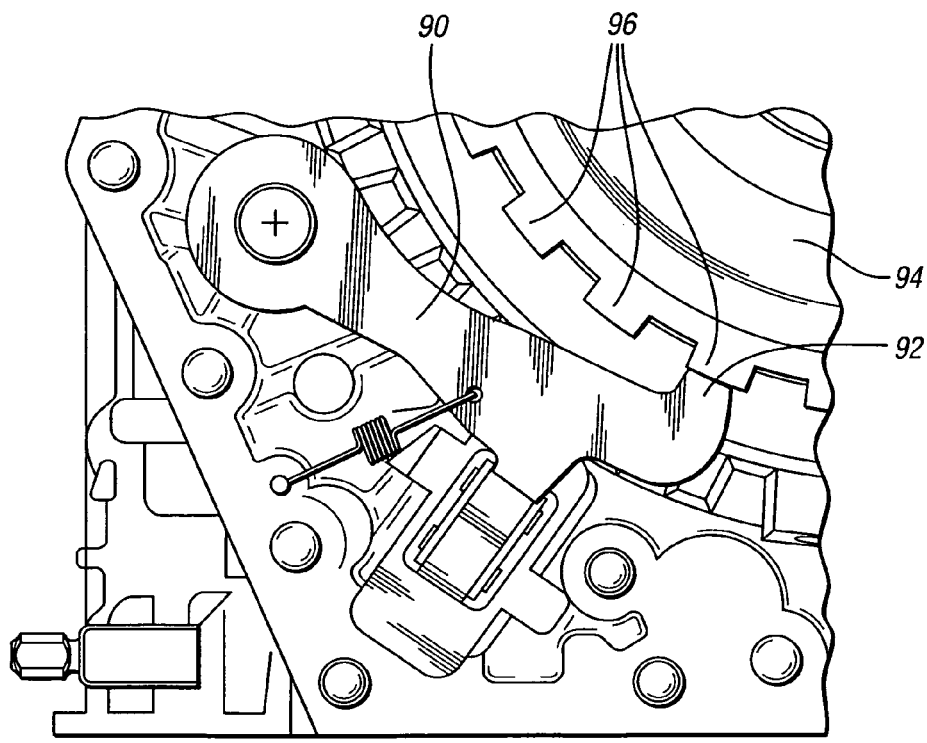
FIG. 3b is a partial side view of a park pawl tooth aligned with an output gear tooth of the present invention.

Referring to FIG. 3a, a park pawl 90 having a park tooth 92, and an output gear 94 having a plurality of teeth 96 are shown in detail. The output gear 94 is attached to the output shaft 20 (shown in FIG. 1) such that the components rotate together. When properly engaged, the park tooth 92 is disposed between a pair of adjacent output gear teeth 96 as shown in FIG. 3a. As shown in FIG. 3b, the park tooth 92 may align with one of the output gear teeth 96 when a vehicle is brought to a stop which is known as a "tooth butt condition". If the transmission is shifted into park from a "tooth butt condition", potential energy stored in the output shaft 20 is released causing the output shaft 20 and output gear 94 to rotate until the park tooth 94 drops into engagement between a pair of adjacent output gear teeth 96. Relative motion between the park pawl 90 and the output gear 94 can cause an objectionable noise when the park tooth 92 drops into engagement and contacts one of the output gear teeth 96.

The method of the present invention is adapted to prevent any objectionable noise when the park tooth 92 engages one of the output gear teeth 96 during a drive to park shift as will be described in detail hereinafter. More precisely, the method of the present invention is adapted to lock the transmission output shaft 20 (shown in FIG. 1) when the vehicle comes to a stop by applying one or more clutches. For the exemplary transmission 14, braking clutch C4 (shown in FIG. 1) is applied to lock the transmission output shaft 20 when the vehicle comes to a stop, however, a different clutch or combination of clutches may be required for other transmissions. When the transmission 14 is shifted to park, the clutch C4 is released in a controlled manner by slipping the C4 clutch plates (not shown). This controlled slipping limits the rotational speed of the transmission output shaft 20 and the output gear 94 attached thereto, and thereby reduces the relative motion between the park pawl 90 and the output gear 94 such that any noise generated when the park tooth 92 contacts one of the output gear teeth 96 is minimized and not objectionable.

The method for improving a drive-to-park shift in an automatic transmission according to the present invention will now be described as it applies to the transmission 14. It should, however, be appreciated that the method of the present invention is applied to the transmission 14 for exemplary purposes only, and this method may also be applied to any number of alternate transmission configurations as well.

Figure 4:
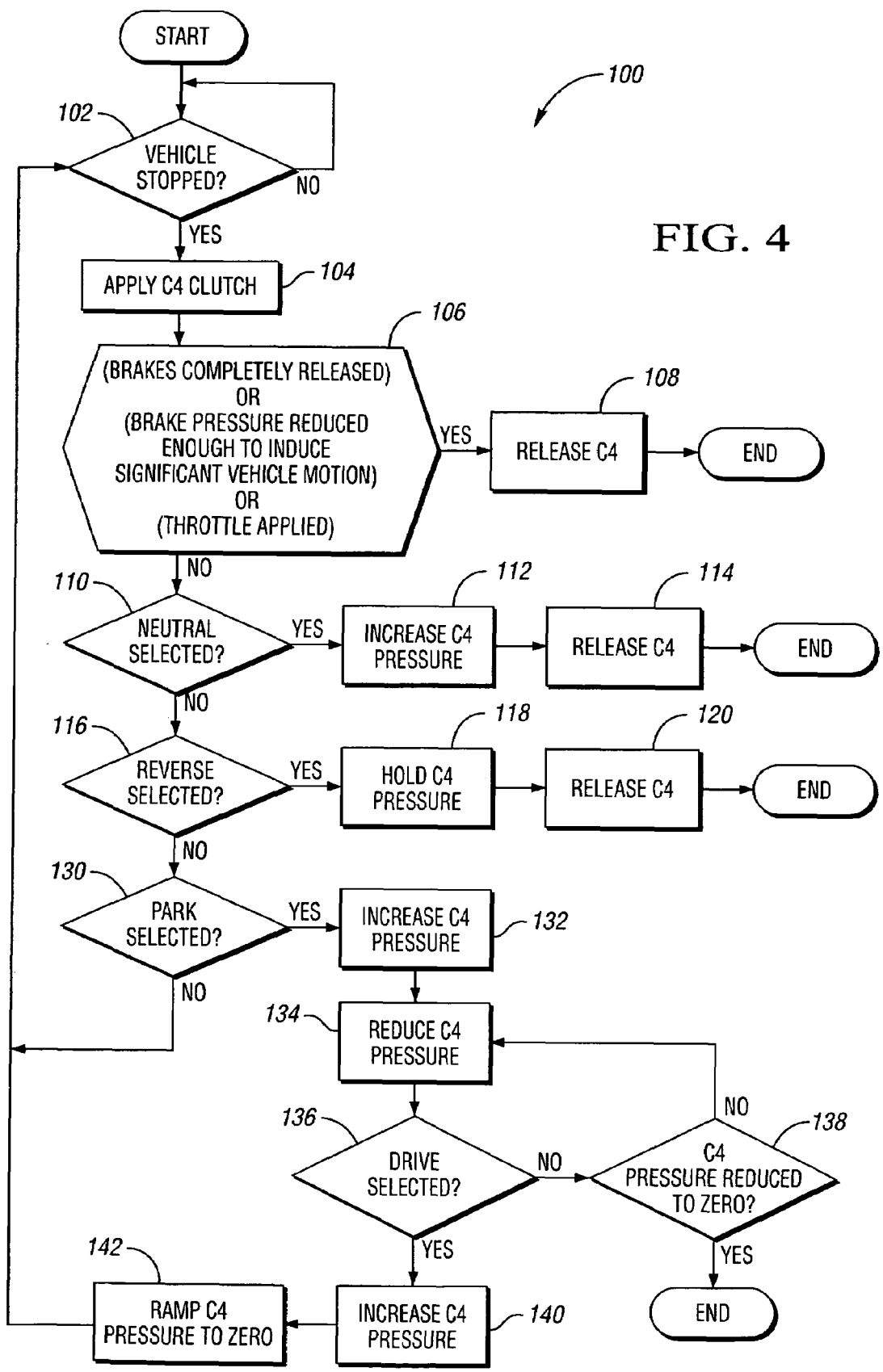
FIG. 4 is a flow chart depicting a method of the present invention.

The method for improving a drive to park shift in an automatic transmission includes the algorithm 100 shown in detail in FIG. 4. More precisely, FIG. 4 shows a series of block diagrams representing steps performed by the control unit 66.

At step 102, the algorithm 100 determines whether the vehicle is stopped and in drive. If the vehicle is not stopped and in drive, the algorithm repeats step 102. If the vehicle is stopped and in drive, the algorithm 100 proceeds to step 104. When the vehicle is stopped and in drive, the exemplary transmission 14 is in first gear and clutches C1 and C5 (shown in FIG. 1) are therefore engaged, however, different clutch combinations may be required to engage the first gear speed ratio in other transmissions. At step 104, the algorithm retains the transmission output shaft 20 (shown in FIG. 1). For the exemplary transmission 14, the transmission output shaft 20 is retained at step 104 by applying clutch C4 (shown in FIG. 1), however, a different clutch or clutch combination may be required to lock the output shaft on other transmissions. According to a preferred embodiment of the present invention, the clutch C4 is applied at step 104 at low pressure as will be described in detail hereinafter.

As the clutch C4 is implemented to retain the transmission output shaft 20 at step 104, full engagement of the C4 clutch could prevent or impair acceleration of the vehicle. Accordingly, the clutch C4 is preferably applied at low pressure to ensure that vehicle operation is not affected if the driver accelerates rather than shifting into park. The method of the present invention therefore provides a C4 clutch pressure value within a range defined by that which is enough to prevent an objectionable noise when the park tooth 92 contacts one of the output gear teeth 96, and that which is not so much that vehicle operation is affected if the driver accelerates after coming to a stop.

According to a preferred embodiment of the present invention, the C4 clutch pressure applied at step 104 is calculated during closed throttle 3-2 downshifts. For purposes of the present invention, a closed throttle 3-2 downshift is a shift from a third gear speed ratio to a second gear speed ratio which takes place while the throttle is closed. As described in U.S. Pat. No. 5,211,079 to Runde et. al., which is hereby incorporated by reference in its entirety, during a closed throttle 3-2 downshift a C4 clutch pressure that is very consistently a threshold amount above the clutch return spring pressure is calculated. By using this C4 pressure value for purposes of the present invention, the C4 clutch is ready to command a higher pressure as required but does not affect vehicle motion if the driver accelerates.

At step 106, the algorithm determines whether the operator has completely released the brake, reduced the brake pressure enough to induce significant vehicle motion, or applied the throttle. For purposes of the present disclosure, significant vehicle motion is defined as that which exceeds a predefined limit. Vehicle motion may be detected, for example, by a position/speed sensor (not shown) attached to the drive shaft R (shown in FIG. 1). If none of the conditions of step 106 have been met, the algorithm 100 proceeds to step 110. If any of the conditions of step 106 have been met, the algorithm 100 proceeds to step 108. At step 108, clutch C4 is released in a controlled manner by slipping the C4 clutch plates (not shown) to minimize any noise generated when the park tooth 92 contacts one of the output gear teeth 96 (shown in FIG. 3*a*).

At step 110, the algorithm 100 determines if the transmission 14 has been shifted into neutral. If the transmission 14 has not been shifted to neutral, the algorithm 100 proceeds to step 116. If the transmission 14 has been shifted to neutral, the algorithm 100 proceeds to step 112. At step 112, C4 clutch pressure is increased. As the vehicle is in neutral and cannot accelerate, the limit on C4 clutch pressure adapted to allow unrestricted vehicle acceleration is no longer required and C4 clutch pressure may be safely increased at step 112. If the transmission 14 is shifted to park after step 112, the increased C4 clutch pressure will permit better retention of the transmission output shaft 20 (shown in FIG. 1) to further minimize any noise generated when the park tooth 92 contacts one of the output gear teeth 96 (shown in FIG. 3*a*). If, after a predetermined amount of time, the transmission 14 remains in neutral, the algorithm 100 proceeds to step 114. At step 114, the clutch C4 is released in a controlled manner by slipping the C4 clutch plates (not shown) such that any potential energy stored in the transmission output shaft 20 is slowly released. If the transmission 14 is shifted to park as clutch C4 is being released at step 114, there will not be an objectionable noise because clutch C4 is released at a controlled rate adapted to limit relative motion between the park tooth 92 and the output gear teeth 96.

At step 116, the algorithm 100 determines if the transmission 14 has been shifted into reverse. If the transmission has not been shifted to reverse, the algorithm 100 proceeds to step 130. If the transmission has been shifted to reverse, the algorithm 100 proceeds to step 118. At step 118, C4 clutch pressure is held constant for a predetermined amount of time. The predetermined amount of time is adapted to allow an on-coming clutch to gain capacity for the shift to reverse. For the exemplary transmission 14, the on-coming clutch for the shift to reverse is the C3 clutch (shown in FIG. 1), however, the on-coming clutch may vary for other transmissions. At step 120, the clutch C4 is released in a controlled manner by slipping the C4 clutch plates (not shown) such that any potential energy stored in the transmission output shaft 20 is slowly released. If park is selected during step 120 as clutch C4 is being released, the algorithm 100 increases C4 clutch pressure to retain the output shaft 20. After park has been selected, C4 clutch pressure is released in a controlled manner to allow the park pawl 90 to slowly engage the output gear 94 (shown in FIG. 3*a*).

At step 130, the algorithm 100 determines if the transmission 14 has been shifted into park. If the transmission 14 has not been shifted to park, the algorithm 100 returns to step 102. If the transmission 14 has been shifted to park, the algorithm 100 proceeds to step 132. At step 132, C4 clutch pressure is increased to retain the output shaft 20 (shown in FIG. 1). At step 134, C4 clutch pressure is released in a controlled manner to allow the park pawl 90 to slowly engage the output gear 94 (shown in FIG. 3*a*). At step 136, the algorithm 100 determines whether the transmission 14 has been shifted to drive. If, at step 136, the transmission 14 has not been shifted to drive, the algorithm 100 proceeds to step 138. If, at step 136, the transmission 14 has been shifted to drive, the algorithm 100 proceeds to step 140. At step 138, the algorithm 100 determines whether the C4 clutch pressure has been reduced to zero. If, at step 138, the C4 clutch pressure has not been reduced to zero, the algorithm 100 returns to step 134. If, at step 138, the transmission 14 has been shifted to drive, the algorithm proceeds to step 140. At step 140, C4 clutch pressure is increased to retain the output shaft 20. At step 142, C4 clutch pressure is released in a controlled manner to allow the park pawl 90 to slowly engage the output gear 94. After completing step 142, the algorithm 100 returns to step 102.

While the best modes for carrying out the invention have been described in detail, those familiar with the art to which this invention relates will recognize various alternative designs and embodiments for practicing the invention within the scope of the appended claims.

The invention claimed is:

1. A method providing an improved shift into park in a vehicle with an automatic transmission having a plurality of clutches and an output shaft with an output gear attached thereto, the method comprising:
   applying a braking clutch, wherein application of the braking clutch retains the transmission output shaft;
   determining when the transmission is shifted into neutral, and thereafter releasing the braking clutch in response to the transmission being shifted into neutral;
   engaging a park pawl with the output gear when the vehicle is shifted into park, wherein the relative motion between the park pawl and the output gear is minimized by the braking clutch such that the engagement of the park pawl and the output gear does not generate an objectionable noise; and
   releasing the braking clutch.

2. The method of claim 1, wherein said applying a braking clutch includes applying the braking clutch at low pressure such that vehicle motion is not impeded.

3. The method of claim 1, further comprising determining when a vehicle brake has been completely released, and thereafter releasing the braking clutch only when the vehicle brake has been completely released.

4. The method of claim 1, further comprising determining when a throttle has been applied, and thereafter releasing the braking clutch only when the throttle is applied.

5. The method of claim 1, wherein said releasing the braking clutch includes slowly releasing the braking clutch in a controlled manner.

6. A method providing an improved shift into park in a vehicle with an automatic transmission having a plurality of clutches and an output shaft with an output gear attached thereto, the method comprising:
   determining when the vehicle is stopped;
   applying a braking clutch when the vehicle is stopped, wherein application of the braking clutch retains the transmission output shaft;
   determining if a vehicle brake has been released after the vehicle is stopped, and thereafter releasing the braking clutch if the vehicle brake has been released; and
   engaging a park pawl with the output gear when the vehicle is shifted into park, wherein the relative motion between the park pawl and the output gear is minimized by the braking clutch and the engagement of the park pawl and output gear cannot generate an objectionable noise.

7. The method of claim 6, wherein said applying a braking clutch includes applying the braking clutch at low pressure such that vehicle motion is not impeded.

8. The method of claim 6, further comprising determining if a throttle is applied after the vehicle is stopped, and thereafter releasing the braking clutch if the throttle is applied.

9. The method of claim 6, further comprising determining if the transmission is shifted into neutral, and thereafter releasing the braking clutch if the transmission is shifted into neutral.

10. A method providing an improved shift into park in a vehicle with an automatic transmission having a plurality of clutches and an output shaft with an output gear attached thereto, the method comprising:
    determining when the vehicle is stopped;
    applying a braking clutch when the vehicle is stopped, wherein application of the braking clutch retains the transmission output shaft;
    determining if a vehicle brake has been released after the vehicle is stopped, and thereafter slowly releasing the braking clutch in a controlled manner if the vehicle brake has been released;
    determining if a throttle is applied after the vehicle is stopped, and thereafter slowly releasing the braking clutch in a controlled manner if the throttle is applied; and
    engaging a park pawl with the output gear when the vehicle is shifted into park, wherein the relative motion between the park pawl and the output gear is minimized by the braking clutch and the engagement of the park pawl and output gear cannot generate an objectionable noise.

11. The method of claim 10, wherein said applying a braking clutch includes applying the braking clutch at low pressure such that vehicle motion is not impeded.

12. The method of claim 10, further comprising determining if the transmission is shifted into neutral, and thereafter slowly releasing the braking clutch in a controlled manner if the transmission is shifted into neutral.

13. A method providing an improved shift into park in a vehicle with an automatic transmission having a plurality of clutches and an output shaft with an output gear attached thereto, the method comprising:
    applying a braking clutch, wherein application of the braking clutch retains the transmission output shaft;
    determining when a vehicle brake has been partially released such that vehicle motion exceeding a predetermined limit is detected, and thereafter releasing the braking clutch in response to vehicle motion exceeding said predetermined limit;
    engaging a park pawl with the output gear when the vehicle is shifted into park, wherein the relative motion between the park pawl and the output gear is minimized by the braking clutch such that engagement of the park pawl and the output gear does not generate an objectionable noise; and
    releasing the braking clutch.

14. The method of claim 13, wherein said applying a braking clutch includes applying the braking clutch at low pressure such that vehicle motion is not impeded.

15. The method of claim 13, farther comprising determining when the vehicle brake has been completely released, and thereafter releasing the braking clutch in response to the vehicle brake being completely released.

16. The method of claim 13, further comprising determining when a throttle has been applied, and thereafter releasing the braking clutch in response to the throttle being applied.

17. The method of claim 13, wherein said releasing the braking clutch includes slowly releasing the braking clutch in a controlled manner.

18. The method of claim 13, further comprising determining if the transmission is shifted into neutral, and thereafter releasing the braking clutch in response to the transmission being shifted into neutral.

19. The method of claim 13, further comprising determining if the transmission is shifted into reverse, and thereafter releasing the braking clutch in response to the transmission being shifted into reverse.

* * * * *